L. C. LOEWENSTEIN.
PREVENTING PULSATIONS IN CENTRIFUGAL AIR COMPRESSORS.
APPLICATION FILED NOV. 13, 1912.

1,063,558.

Patented June 3, 1913.

Witnesses:

Inventor,
Louis C. Loewenstein,
by
Att'y

UNITED STATES PATENT OFFICE.

LOUIS C. LOEWENSTEIN, OF LYNN, MASSACHUSETTS, ASSIGNOR TO GENERAL ELECTRIC COMPANY, A CORPORATION OF NEW YORK.

PREVENTING PULSATIONS IN CENTRIFUGAL AIR-COMPRESSORS.

1,063,558.    Specification of Letters Patent.    Patented June 3, 1913.

Application filed November 13, 1912.   Serial No. 731,146.

*To all whom it may concern:*

Be it known that I, LOUIS C. LOEWENSTEIN, a citizen of the United States, residing at Lynn, in the county of Essex, State of Massachusetts, have invented certain new and useful Improvements in Preventing Pulsations in Centrifugal Air-Compressors, of which the following is a specification.

This invention relates to centrifugal air-compressors, and its object is to prevent the pulsations or surges of air which are liable to occur when the machine is operating against a fluctuating load, such for example as a blast furnace in which the resistance occasioned by the charges of fuel, ore and flux varies considerably from time to time. In such cases when the flow is retarded, the air is liable to accumulate in the delivery conduit of the compressor until its pressure rises so high as to cause a backward rush in said conduit, to be quickly succeeded by a forward rush to restore the lost pressure, and so on; the surging sometimes becoming so violent as to endanger the apparatus.

My invention aims to prevent the occurrence of these abnormal and dangerous surges, and to this end it consists in a nozzle of sheet metal placed in the conduit, preferably the intake pipe of the compressor. It permits the air to flow freely into the machine, but if any reversal of the current takes place it will be throttled by the nozzle, and thus any tendency to surging will be checked. The effect can be regulated by a damper controlling a number of holes, or ports in or near the base of the nozzle.

Figure 1:
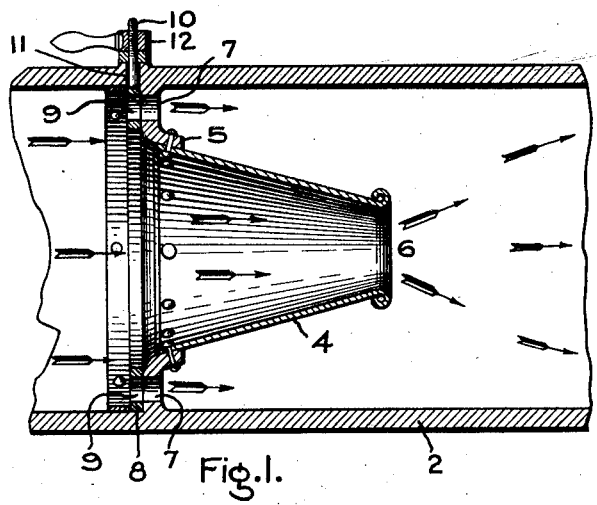
Figure 2:
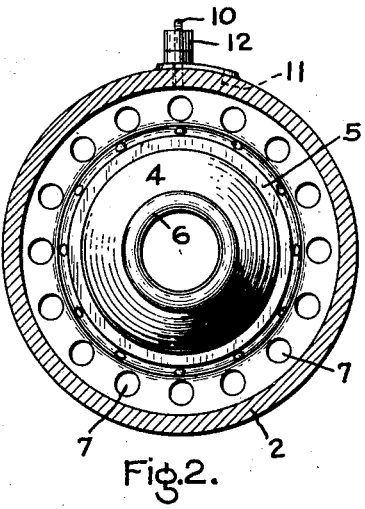
Figure 3:
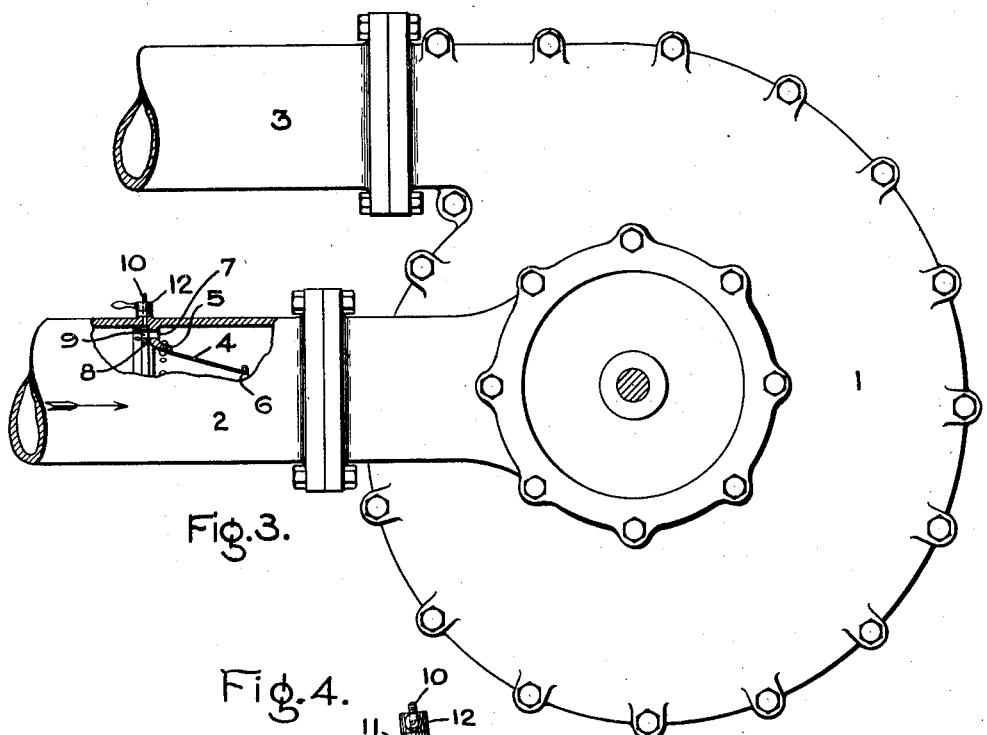
Figure 4:
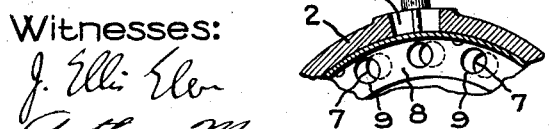

In the accompanying drawing, Figure 1 is a longitudinal section of a portion of the air conduit showing the nozzle in section; Fig. 2 is a cross section of the conduit, showing the nozzle in elevation; Fig. 3 is an outline view, partly in section, of a compressor equipped with my invention; and Fig. 4 shows the means for adjusting the damper.

The centrifugal air-compressor 1 has an intake pipe 2 and a delivery conduit 3. In one of these, preferably the intake pipe, is inserted a frusto-conical nozzle 4 of sheet metal, which is preferably supported by being riveted to an internal flange 5 in a section of the intake pipe. The smaller end 6 of the nozzle points toward the machine, and its diameter is preferably between one third and one quarter that of the conduit.

In the flange 5 are several ports 7 which are controlled by an annular damper 8 having a plurality of ports 9 adapted to be brought into or out of registration with those in the flange when said damper is given sufficient angular movement. The damper can be actuated by means of a radial handle 10 playing in a slot 11 in the conduit and having a nut 12 to lock it in any given position.

When the compressor is in operation the air can flow freely through the nozzle, gradually increasing in speed as it passes from the wide base to the narrow mouth 6. Air can also flow through the ports 7 and 9 thereby preventing any vacuum in the space around the nozzle. The conical form of the nozzle has a coefficient of efflux between .90 and .99 so that the velocity of flow is nearly proportional to the square root of the pressure. But if the direction of flow is reversed, a different state of affairs exists. The air must pass into the nozzle through the small end 6, which is practically the equivalent of an orifice of this size in a thin partition between two chambers of differing pressures. In such cases, the co-efficient of flow is from .56 to .79 so that the velocity of flow is much less in this direction than in the other. A corresponding resistance of flow is set up, which has the effect of damping the backward rush of air and discouraging any tendency to surging. The nozzle thus acts somewhat like a check-valve, without the disadvantage of an ordinary check-valve in the way of cost, wear of moving parts, repairs, etc.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. The combination with a centrifugal air-compressor, of means for checking a backward rush of air, which consists of a nozzle in the air conduit shaped to permit the air to pass more freely in the forward direction than in the other.

2. The combination with a centrifugal air-compressor, of a frusto-conical nozzle in the air conduit, having its smaller end pointing in the direction of proper flow.

3. The combination with a centrifugal air-compressor, of a nozzle in the air conduit, and ports surrounding the base of said nozzle.

4. The combination with a centrifugal air-compressor, of a frusto-conical nozzle in the air conduit, and ports surrounding the base of said nozzle.

5. The combination with a centrifugal air-compressor, of a frusto-conical nozzle in the air conduit, ports surrounding the base of said nozzle, and means for adjusting the opening of said ports.

6. The combination with a centrifugal air-compressor, of a frusto-conical nozzle in the air conduit, ports surrounding the base of said nozzle, and a rotary damper for regulating said ports.

7. The combination with a centrifugal air-compressor, of a flange in the air conduit, and a sheet-metal frusto-conical nozzle secured to said flange.

8. The combination with a centrifugal air-compressor, of a flange in the air conduit provided with ports, a damper controlling said ports, and a sheet-metal nozzle riveted to said flange, and pointing in the direction of proper flow.

In witness whereof, I have hereunto set my hand this eleventh day of November, 1912.

LOUIS C. LOEWENSTEIN.

Witnesses:
JOHN A. McMANUS, Jr.,
FRANK G. HATTIE.

---

Copies of this patent may be obtained for five cents each, by addressing the "Commissioner of Patents, Washington, D. C."